United States Patent
Heinzmann et al.

(10) Patent No.: US 10,270,120 B2
(45) Date of Patent: Apr. 23, 2019

(54) FUEL CELL STACK ASSEMBLY-COMPRESSION SYSTEM

(71) Applicant: GM GLOBAL TECHNOLOGY OPERATIONS LLC, Detroit, MI (US)

(72) Inventors: Martin Heinzmann, Rochester Hills, MI (US); David A. Martinchek, Spencerport, NY (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 520 days.

(21) Appl. No.: 15/000,276

(22) Filed: Jan. 19, 2016

(65) Prior Publication Data

US 2017/0207477 A1    Jul. 20, 2017

(51) Int. Cl.
*H01M 8/248* (2016.01)
*H01M 8/2404* (2016.01)
*H01M 8/2432* (2016.01)
*H01M 8/1018* (2016.01)

(52) U.S. Cl.
CPC ......... *H01M 8/248* (2013.01); *H01M 8/2404* (2016.02); *H01M 8/2432* (2016.02); *H01M 2008/1095* (2013.01); *H01M 2250/20* (2013.01); *Y02T 90/32* (2013.01)

(58) Field of Classification Search
CPC .. H01M 8/248; H01M 8/2432; H01M 8/2404; H01M 2008/1095; H01M 2250/20; Y02T 90/32
USPC .......................................................... 429/535
See application file for complete search history.

(56) References Cited

U.S. PATENT DOCUMENTS

2012/0100452 A1* 4/2012 Ogawa ................ H01M 8/0247
                                                           429/455
2016/0013508 A1* 1/2016 Martinchek ......... H01M 8/2475
                                                           429/469

OTHER PUBLICATIONS

Martinchek, David A. et al., U.S. Appl. No. 14/482,000, filed Sep. 10, 2014, entitled, "Fuel Cell Stack Assembly—Datum Design for Fuel Cell Stacking and Collision Protection".

* cited by examiner

*Primary Examiner* — Gary D Harris
(74) *Attorney, Agent, or Firm* — Cantor Colburn LLP (57) ABSTRACT

A system and method for assembling and compressing a fuel cell stack. The system and method include a fuel cell stack housing with a plurality of side walls that create an enclosure that is open on two opposing ends, at least one channel formed on an inner side wall surface, and a first end structural frame that is affixed to one of the open ends of the housing, the first end structural frame including at least one tooling opening through a planar surface. The system and method further include tooling that passes through the at least one tooling opening of the first end structural frame and that extends up through the housing to the open end of the housing, the tooling capable of moving down incrementally while fuel cell stack components are being loaded into the housing through the open end that is opposite to the first end structural frame.

20 Claims, 7 Drawing Sheets

FUEL CELL STACK ASSEMBLY-COMPRESSION SYSTEM

BACKGROUND OF THE INVENTION

Field of the Invention

This invention relates generally to a system and method for assembling and compressing a fuel cell stack and, more particularly, to a system and method for assembling a fuel cell stack within an enclosure and compressing the fuel cell stack that is within the enclosure and then securing a cover over the stack and onto the enclosure such that stack compression is maintained.

Discussion of the Related Art

Fuel cells may be used to convert a fuel, such as hydrogen, into usable electricity through the use of an electrochemical reaction. Unlike internal combustion engines, fuel cells convert fuel into usable electricity without relying on combustion as an intermediate step. Thus, the use of fuel cells has environmental advantages when compared to internal combustion engines. A hydrogen fuel cell, for example, is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode, and react with oxygen and electrons in the cathode to generate water. The electrons from the anode cannot pass through the electrolyte, and thus are directed through a load to perform work in the form of direct current (DC) to the cathode via an external circuit that typically includes a load, such as an electric motor.

Proton exchange membrane fuel cells (PEMFCs) are a common type of fuel cell that is used for vehicle applications. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). The delivery of reactants to the MEA, the removal of byproduct water, and the delivery of the generated electrical current to the load is facilitated via a gas-permeable layer (often referred to as a gas diffusion layer) and a bipolar plate. An anode gas diffusion layer is arranged in facing contact with the anode catalyst layer, while a cathode gas diffusion layer is arranged in facing contact with the cathode catalyst layer. As described herein, the MEA is understood to include the anode gas diffusion layer and the cathode gas diffusion layer. Each MEA is sandwiched between bipolar plates to create a fuel cell. During assembly, one MEA may be affixed to one bipolar plate by securing a planar surface of one of the electrodes (and one of the gas diffusion layers) to a planar surface of the bipolar plate to create a fuel cell that is ready for stacking, as is understood by those skilled in the art.

Several fuel cells are typically combined in a fuel cell stack to generate the desired power. For example, a fuel cell stack for a vehicle may have two hundred or more stacked fuel cells that are connected in series along a common stacking dimension, e.g., are stacked in a manner that is similar to a ream of paper, to form a fuel cell stack. As stated above, the bipolar plates are positioned on both sides of the MEAs of each fuel cell in a fuel cell stack. The stacked fuel cells are positioned between an end plate assembly and an end plate on each end of the stack. Each bipolar plate includes an anode side and a cathode side for adjacent fuel cells in the stack, where anode gas flow channels are provided on the anode side of the bipolar plates that allow for the anode reactant gas to flow to the respective MEA, and cathode gas flow channels are provided on the cathode side of the bipolar plates that allow the cathode reactant gas to flow to the respective MEA. One of the end plates of the fuel cell stack includes anode gas flow channels, and the other end plate includes cathode gas flow channels. Each of the end plate assemblies include an insulator plate and a current collector plate. The bipolar plates and the current collector plates are made of a conductive material such that the current collector plates conduct the electricity generated by the fuel cells through the bipolar plates and out of the stack. The insulator plates insulate the stack, as is known to those skilled in the art.

Integrating fuel cell stacks into automotive platforms requires precise placement and alignment with balance of plant equipment inside the vehicle's fuel cell system compartment, such as, by way of example, blowers, pumps, hoses, compressors, etc. The precise placement and alignment translates to tight dimensional tolerances of the assembled fuel cell stack. Additionally, fuel cell stacks that are in vehicles must be able to withstand stresses that are caused by acceleration, deceleration, crashes, accidents and various other impacts, and must also retain the position of the fuel cells in the stack relative to each other throughout the life of the fuel cell stack. High shearing force during the stresses described above may cause sliding between the cells of the stack, and small displacements between cells may result in large cell block displacements when all of the fuel cells are considered. Further, the problem of displacements between cells may be intensified by cold start conditions because thermally induced contraction may reduce a y-axis compression retention load that was placed on the cells during stack assembly.

The bipolar plates are sized such that they fit over and around the periphery of the MEAs that they are stacked in between. To improve alignment of each plate and MEA during assembly of the fuel cell stack, one or more datum structures, or simply datum, may be formed in part of or secured onto one or more of the bipolar plates. The datum may further include a bore that is configured to accept a datum pin to promote alignment of the bipolar plates and cells during the stacking process in a manner that is understood by those skilled in the art.

Fuel cell stacks are typically assembled under a compressive load so as to seal the fuel cells and to achieve low interfacial electrical resistance between the bipolar plates, the gas diffusion layers and the catalyst electrodes of fuel cells that make up the stack. The compressive load may be applied by a pressing agent, for example, a press. The compressive load on the fuel cell stack, which usually ranges from about 80 to 160 psi, depending on humidification, is maintained by a compression retention enclosure, also known as a housing, that encases the fuel cell stack. For example, to establish the desired compressive force, a press may be used to apply a load to the stack. Next, a compression retention system that includes a compression retention enclosure that houses the stack is affixed to the stack in a manner that maintains the compressive force on the stack after the press is released. Interconnecting tie rods or bracketing elements that are mounted along the surface of one or more of the side panels are typically included to bind the discrete components of the housing to maintain the compressive force on the fuel cell stack, or the housing may be a unitary structure that is affixed to the compressed fuel cell stack. Compressive force is retained by securing the tie rods with bolts or related fasteners such that the bolts are loaded in shear. Thereafter, the enclosure that houses the compressed fuel cell stack may be placed into another enclosure for environmental sealing or may simply use enclosing panels and seals for environmental sealing. Once completely housed and sealed, the fuel cell stack is mechanically secured, coupled to balance of plant (BOP) components, and electrically coupled to the vehicle or related device.

In another example, a press may be used to apply a load to a stack or a block of individual cells, and thereafter a housing can be lowered onto and over the stack. However, there is a need in the art to assemble a fuel cell stack in a housing that requires less time using a press to compress a stack and encase the stack in a compression retention system and that does not require a housing structure to be lowered onto and around the fuel cell stack that is being compressed.

SUMMARY OF THE INVENTION

In accordance with the teachings of the present invention, a system and method are disclosed for assembling and compressing a fuel cell stack. The system and method include a fuel cell stack housing that includes a plurality of side walls that create an enclosure that is open on two opposing ends, at least one channel formed on an inner side wall surface, and a first end structural frame that is affixed to one of the open ends of the housing, the first end structural frame including at least one tooling opening through a planar surface. The system and method further include tooling that passes through the at least one tooling opening of the first end structural frame and that extends up through the housing to the open end of the housing, the tooling capable of moving down incrementally while fuel cell stack components are being loaded into the housing through the open end that is opposite to the first end structural frame.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for assembling and compressing a fuel cell stack is merely exemplary in nature, and is in no way intended to limit the invention or its applications or uses.

Figure 1:
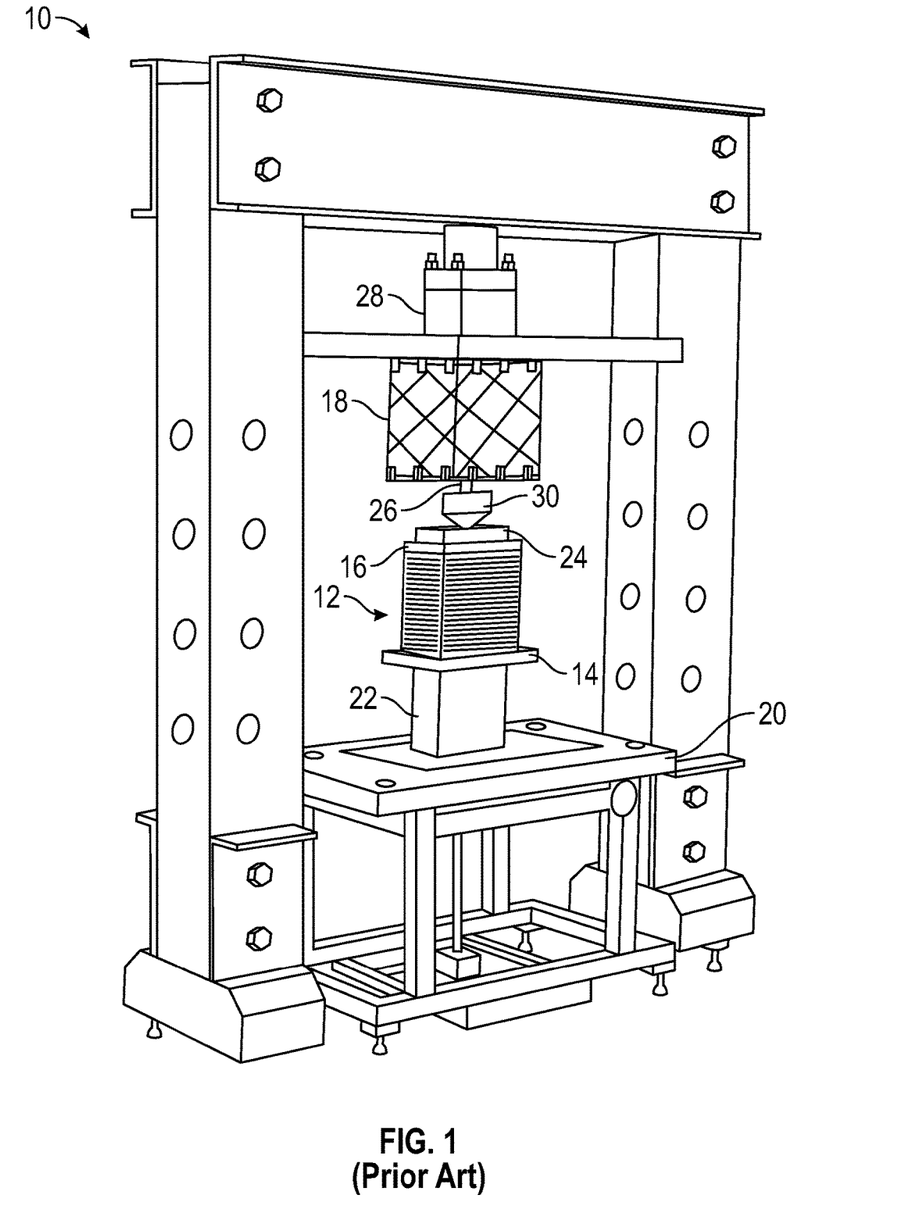
FIG. 1 is an isometric view of a known press that is used to compress a fuel cell stack.

FIG. 1 is an isometric view of a known press 10 that is used to compress a fuel cell stack 12 and that is further used to drop a housing unit 18 down onto and around the fuel cell stack 12 after the stack 12 has been compressed using the press 10. A wet end plate 14 of the fuel cell stack 12 is seated on a lower tool 22 of the press 10, and the lower tool 22 sits above an assembly platform 20. The stack 12 is created in the press by stacking components in a known manner. Once the fuel cell stack 12 is complete, a block-shaped upper tool 24 is used to apply a compressive force to a dry end plate 16 of the fuel cell stack 12 using a rod 26 and an actuator 28 where a travel direction of the upper tool 24 is such that a compressive force is applied to a planar face of the dry end plate 16. A load cell 30 and other components may be used to determine how much shim thickness, if any, is needed to make up for negative deviations from an ideal or target compressed stack height. Once the target compressed stack height is achieved, with or without shims, the housing unit 18, which is preferably a rigid unitary structure, is dropped down over and around the fuel cell stack 12. Once in place over and around the stack 12, the housing unit 18 is affixed to the wet end plate 14 by passing screws, bolts, or similar fasteners, into the bottom of the wet end plate 14 and up into the housing unit 18.

Figure 2A:
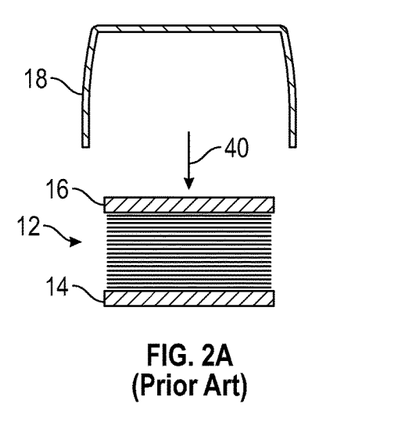
FIGS. 2a-2e illustrate a known process for assembling and compressing a fuel cell stack.
Figure 2B:
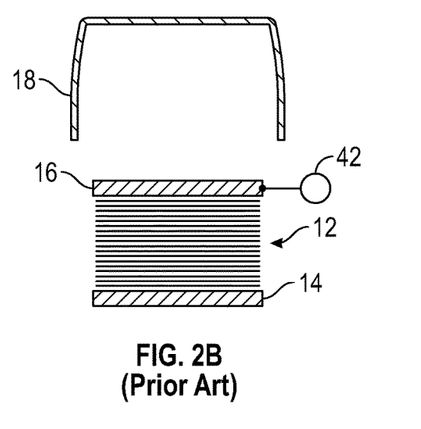
Figure 2C:
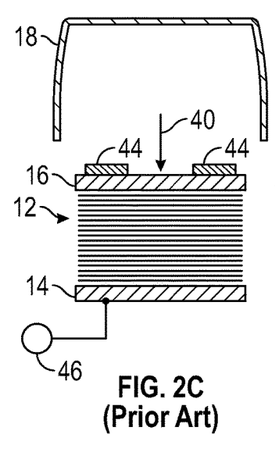
Figure 2D:
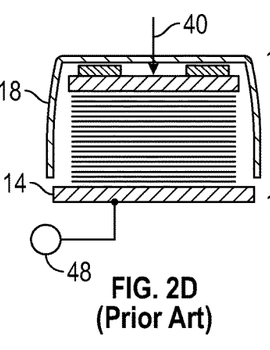
Figure 2E:
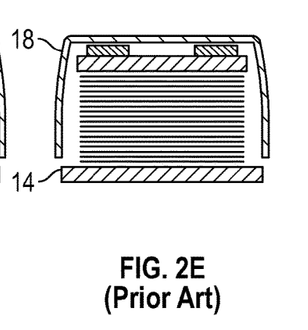

FIGS. 2a-2e illustrate a known process for assembling and compressing the stack 12 and affixing the housing unit 18 to the stack 12 in the press 10 of FIG. 1, where like elements are represented by the same reference numerals. Although not shown for the sake of clarity, the process begins by loading the housing unit 18 in a starting position in the press 10, and creating the stack 12 by sequentially loading the necessary components, such as fuel cells, to create the stack 12. Once the stacked fuel cells are in place the dry end plate 16 is positioned on the top of the stack 12. FIG. 2a illustrates a load, represented by arrow 40, that is applied by the press 10 to the assembled stack 12 to compress the fuel cell stack 12 as desired. By way of example, the stack 12 may be compressed to about 2-10 tons. FIG. 2b illustrates the height of the stack 12 being measured, as represented by circle 42, to determine a compressed height of the stack 12 and to determine a shim requirement (if any). FIG. 2c illustrates shims 44 that are added while the stack 12 is under compression such that the desired final stack height is achieved. A shorting test, represented by circle 46, is also performed while the stack 12 is under compression. FIG. 2d illustrates the housing unit 18 lowered onto and over the stack 12 while the stack is under compression. A leak test is performed once the housing unit 18 is fastened in place over and around the stack 12, as represented by circle 48. FIG. 2e illustrates a complete assembly of the housing unit 18 and fuel cell stack 12 that is ready to be removed from the press 10.

The amount of time that the press 10 is used to create the stack 12 as described above is substantial because the stack 12 is created while in the press 10 and the stack 12 is also compressed and the housing unit 18 installed over and around the stack 12 while in the press 10. Furthermore, the housing unit 18 must be affixed to the stack 12 blindly because fastening occurs from the bottom of the wet end plate 14. Maintaining a desired stack profile, i.e., straightness of the stack 12, during the process shown in FIGS. 2a-2e is difficult but necessary in order for the enclosure 18 to drop down over the stack 12. Additionally, the press must be tall enough to suspend the housing unit 18 over the stack 12. Thus, a new approach to assembling a fuel cell stack and encasing a fuel cell stack in a housing is needed to overcome these drawbacks of the process described above and that ensures stack straightness as well as plate-to-plate alignment between adjacent plates of a stack.

Figure 3:
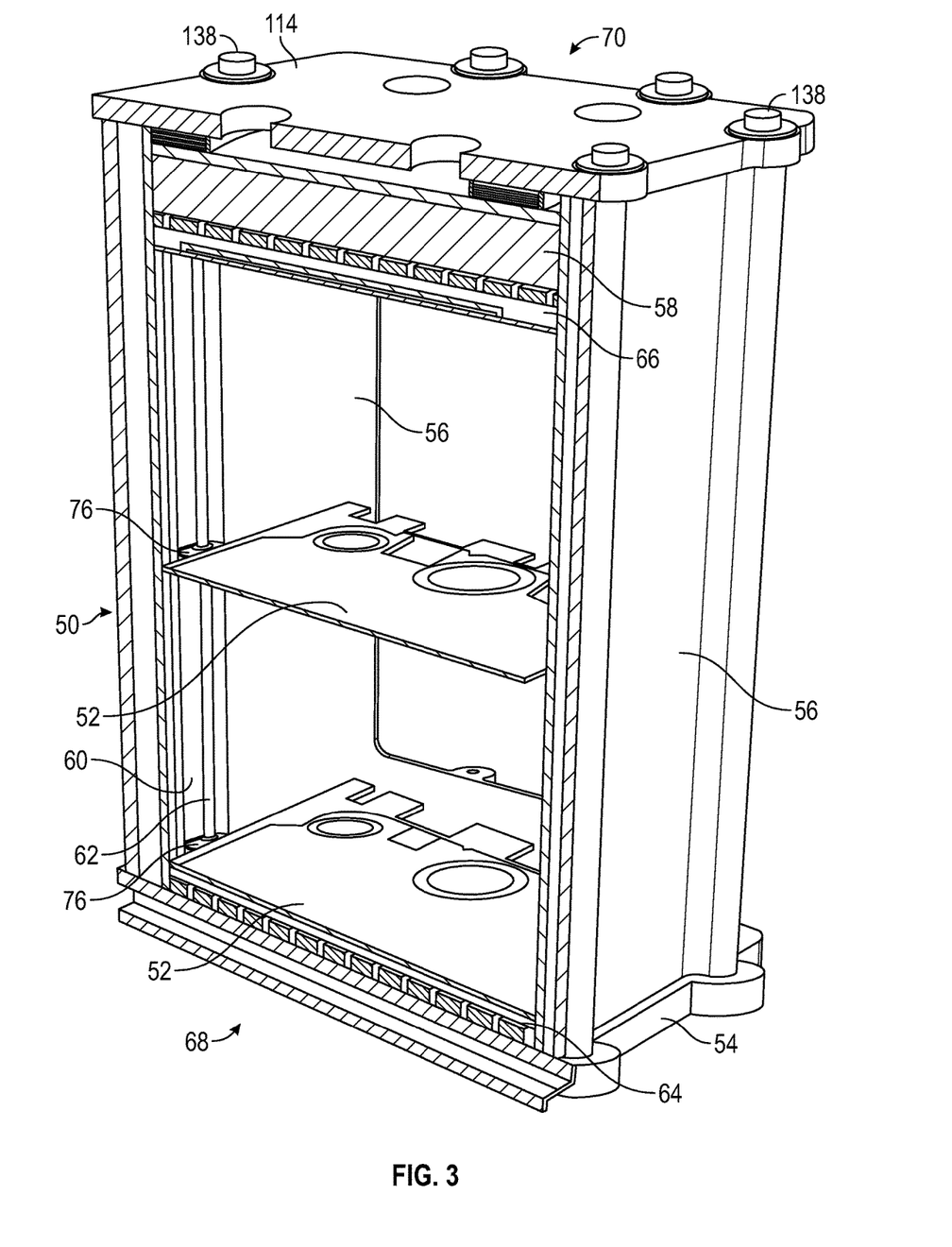
FIG. 3 is an isometric, partial cut-away view of an enclosure that is capable of receiving fuel cell stack components.

FIG. 3 is an isometric, partial cut-away view of an enclosure 50 that includes side walls 56 that create a rigid, generally cuboid shape that is hollow and open on two opposing ends. The enclosure 50 includes internal dimensions that are designed to receive fuel cell components, as described in more detail below. A fuel cell stack end plate structural frame, such as a wet end plate structural frame 54, is securely fastened to edges of the side walls 56 at a bottom end 68 of the enclosure 50. A top end 70 is located at an opposing end relative to the bottom end 68. The side walls 56 may be made of any suitable material, such as aluminum or a composite material.

As stated above, the internal dimensions of the enclosure 50 are designed to fit the shape of fuel cell components that are loaded into the enclosure 50 so that a fuel cell stack may be created within, as is described in more detail below, after the wet end plate structural frame 54 has been securely fastened to the end 68 in any suitable manner. While a complete stack is not shown in the partial cut-away view of FIG. 3 for the sake of clarity, a wet end plate assembly 64 is shown within the enclosure 50 at a location that is adjacent to the wet end plate structural frame 54. The wet end plate assembly 64 includes an insulator plate and a current collector plate. Bipolar plates 52 are also shown in the enclosure 50, along with a dry end plate assembly 66, a dry end structural frame 58, and a cover 114 fastened to the side walls 56 by fasteners 138 near the top end 70. The dry end plate assembly 66 includes an insulator plate and a current collector plate. One or more of the side walls 56 include at least one channel 60 that aligns with datum 76 of the bipolar plates 52, the wet end plate assembly 66 and the dry end plate assembly 68 as is described in more detail below. The channel 60 includes a datum rod 62 that also receives the datum 76 in a manner that is described in detail below.

Figure 4:
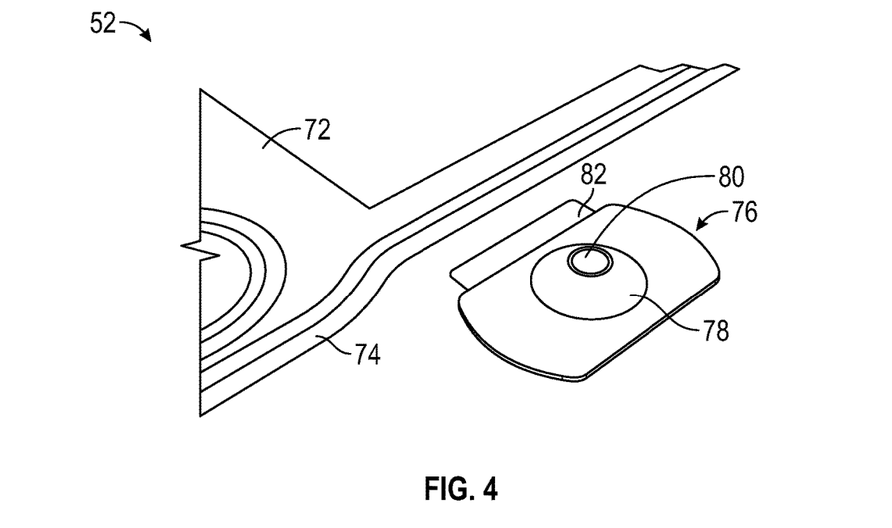
FIG. 4 is a cut-away view of a portion of a bipolar plate that includes a datum.

FIG. 4 is a cut-away view of a portion of the bipolar plate 52 of FIG. 3. Each bipolar plate 52 defines a generally planar face portion 72 and a generally rectangular edge portion 74 that forms a periphery around the face portion 72. A datum 76 that includes a conical feature 78 with a bore 80 therethrough is part of the bipolar plate 52. The datum 76 is affixed to the bipolar plate 52 using an attachment portion 82 or by forming the bipolar plate 52 such that the datum 76 is part of the plate 52. The datum pin 62 that is in the channel 60 of the enclosure 50 passes through the bore 80 when the bipolar plate 52 is loaded into the enclosure 50 as is described in more detail below. The channel 60 is specifically designed to receive the datum 76, and is sized such that a predetermined tolerance, i.e., clearance, between the channel 60 and the datum 76 is provided. For example, a tolerance or clearance of 1 millimeter may be provided to allow for ease of stacking while still maintaining a suitable overall stack straightness. The datum pin 62 that passes through the bore 80 also promotes alignment and typically has a narrow predetermined tolerance or clearance between the datum pin 62 and the circumference of the bore 80. By way of example, the tolerance between the datum pin 62 and the circumference of the bore 80 may be 100 microns to promote plate-to-plate alignment. The conical feature 78 allows the datum 76 of two or more bipolar plates 52 to nest upon stacking of the fuel cells and bipolar plates 52 to further promote plate-to-plate alignment. The datum 76 also serves to improve inter-cell sliding resistance during compression, sealing, and other fuel cell stack assembly operations. The out-of-plane thickness of the datum 76 may be, for example, a thickness that is sufficient to ensure inter-cell sliding resistance is achieved up to three cells above and three cells below a particular fuel cell/bipolar plate 52. Another advantage of the use of the datum 76 is that a permanent connection between cells of the stack is not necessary, making it easier to service individual fuel cells. While one datum 76 is shown per bipolar plate 52 in FIGS. 4 and 5, and two datum 76 are shown in FIG. 6, described in detail below, any suitable number of the datum 76 may be used for each bipolar plate 52.

Figure 5:
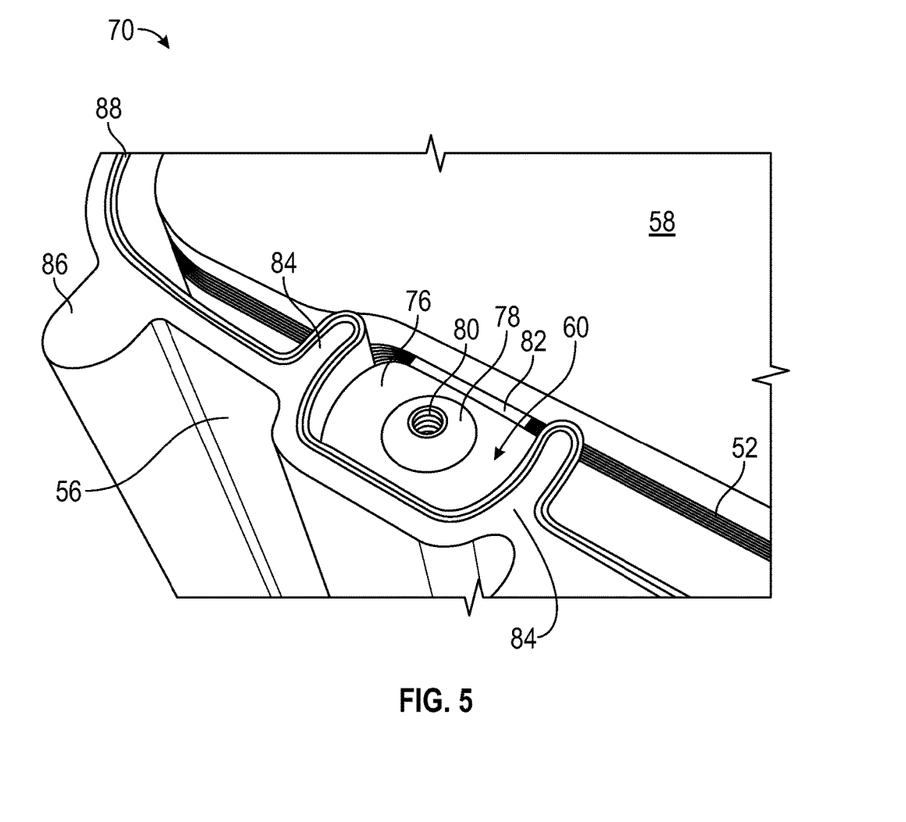
FIG. 5 is a cut-away isometric view of a top end of the enclosure of FIG. 3.

FIG. 5 is a cut-away, isometric view of the top end 70 of the enclosure 50 before the cover 114 has been affixed thereto using fasteners 138. As shown in FIG. 5, the channel 60 in the sidewall 56 has been loaded with the datum 76 of a plurality of bipolar plates 52 and the dry end plate assembly 66. The datum pin 62 is not shown, but passes through the bores 80 as stated above. Edge indentations 84 of the side wall 56 form the channel 60, and edge protrusion 86 provides structural support to the side walls 56 as well as a suitable edge surface to affix the cover 114 using the fasteners 138 to the enclosure 50 using fasteners or the like, as described below. The shape of the bipolar plates 52 and the dry end plate assembly 66 conform to the contour of an inner surface 88 of the side walls 56 as shown.

Figures 6A, 6B:
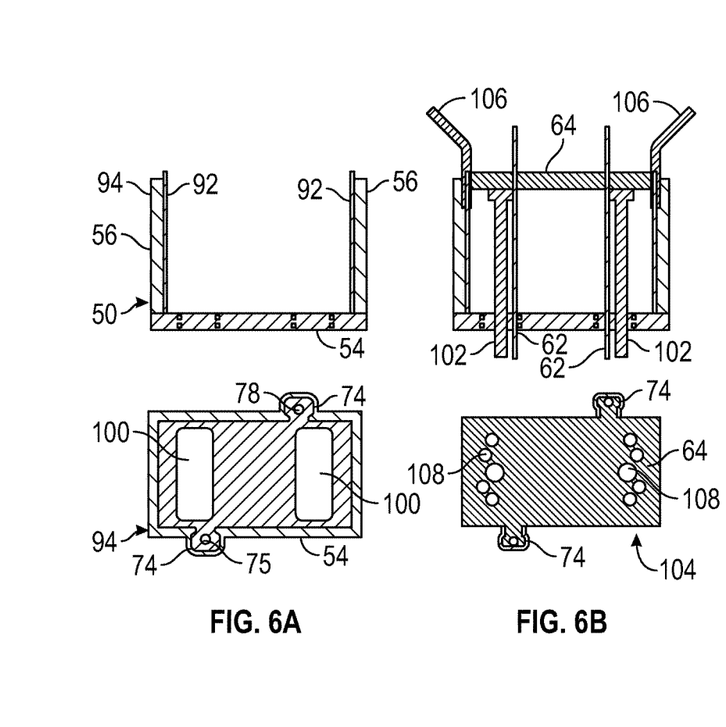
FIGS. 6a-6d illustrate a process for creating a fuel cell stack within the enclosure of FIG. 3.

FIGS. 6a-6d illustrate a process for creating a fuel cell stack 90 in the enclosure 50 prior to placing the stack 90 in a press. Like elements from FIGS. 3, 4 and 5 are referred to by the same reference numerals. FIG. 6a illustrates the side walls 56 affixed to the wet end plate 54, and insulator sleeves 92 that are installed adjacent to the side walls 56 of the enclosure 50. The insulator sleeves 92 serve to insulate the stack from the enclosure 50 once the stack 90 has been assembled therein. A plan view 94 of the wet end plate structural frame 54 that is affixed to the side walls 56 illustrates the datum 76 placed on two of the edges of the wet end plate structural frame 54 that align with the channels 60 of the enclosure, where each of the datum 76 include the bore 80 that is used to receive the datum pin 62 as described above. Although not shown in the cut-away views of FIGS. 6a-6d, front and back side walls 56 of the enclosure 50 are present, and each of the front and back side walls 56 include the channels 60 and the datum pins 62 described above. Openings 100 are provided through the planar surface of the wet end plate structural frame 54 to allow tooling 102 to pass through as is described in more detail below.

FIG. 6b illustrates the first step for creating a fuel cell stack 90 in the enclosure 50. To start, the wet end plate assembly 64 is loaded into the enclosure 50 by fitting the datum 76 into the channels 60 and the bores 80 through the datum pins 62 and resting a planar surface of the wet end plate assembly 64 on the tooling 102. The tooling 102 passes through the openings 100 in the wet end plate structural frame 54 and extend up to a top opening of the enclosure 50 to receive the planar surface of the wet end plate assembly 64. Guides 106 are provided at suitable locations near a top opening of the enclosure 50 and extend down into the enclosure 50 to guide the fuel cell stack components, such as the wet end plate assembly 64, into the enclosure 50. Although not shown for the sake of clarity, the guides 106 may be located on the front and back side walls 56 that include the channels 60 to guide the wet end plate assembly 64 and other fuel cell stack components that will be loaded into the enclosure 50 by aligning the components that are being loaded with the channels 60 and the datum pins 62. Once the wet end plate assembly 64 is loaded into the enclosure 50, the tooling 102 moves down incrementally so that a next component may be loaded. A plan view 104 of the wet end plate assembly 64 illustrates the datum 76 that align with the channels 60 as described above. Openings 108 allow for reactants and coolant to pass through the fuel cell stack 90, as is known to those skilled in the art.

Figure 6C:
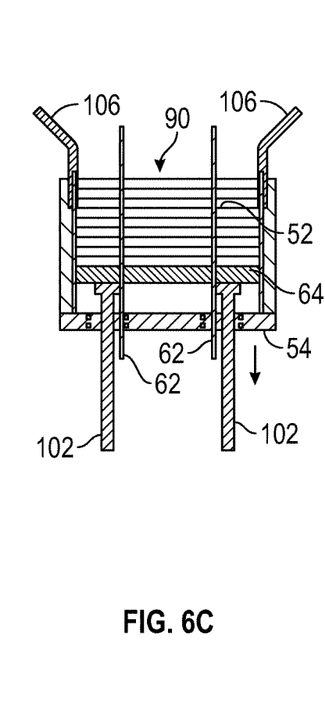
Figure 6D:
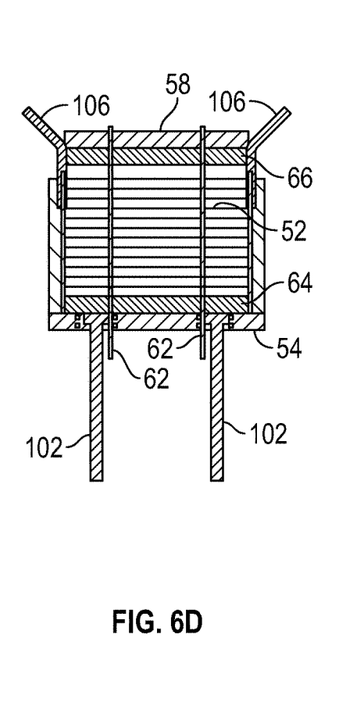

FIG. 6c illustrates the bipolar plates 52 (and the fuel cells associated therewith) being loaded onto the wet end plate assembly 64. The bipolar plates 52 are loaded into the channels 60 and the datum pins 62 of the assembly 50 on top of the wet end plate assembly 64 such that the datum pins 62 pass through the bores 80 of the bipolar plates 52. The tooling 102 incrementally drops down as each bipolar plate 52 is loaded, causing the components to incrementally drop down during the creation of the stack 90. FIG. 6d illustrates the tooling 102 in the wet end plate structural frame 54 after it has incrementally dropped down to a final position and the fuel cell stack 90 is completely loaded into the enclosure 50. The dry end plate assembly 66 is near the top of the stack 90, and is below the dry end structural frame 58 as described above. Alternatively, the dry end structural frame 58 and the dry end plate assembly 66 may be affixed to the enclosure 50 first instead of the wet end structural frame 54 and the wet end plate assembly 64. Although not shown for the sake of clarity, components such as a programmable controller, robotics, sensing devices and ancillary equipment may be included to facilitate the process shown in FIGS. 6a-6d.

Figure 7:
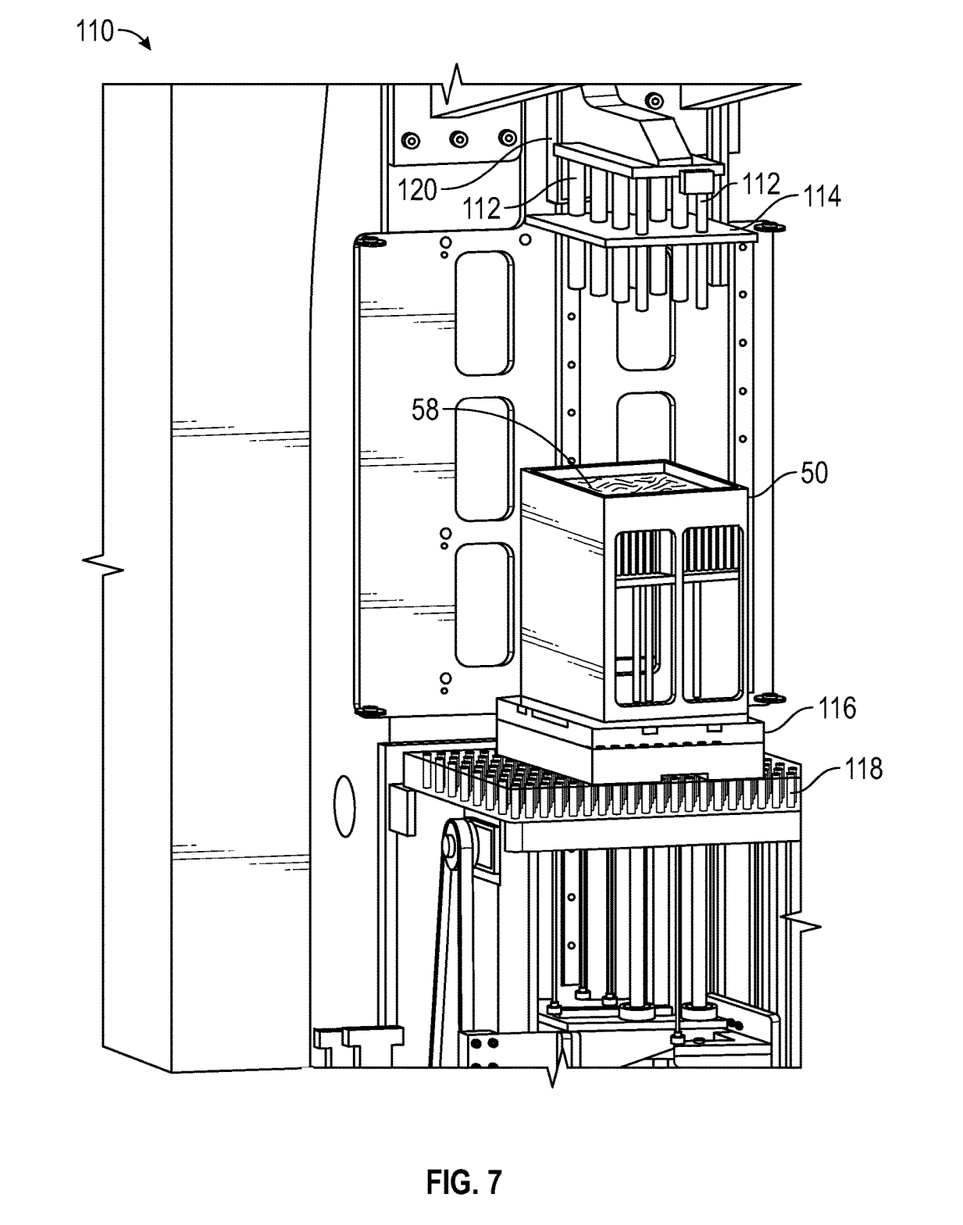
FIG. 7 is an isometric view of a press that may be used with the enclosure after the fuel cell stack has been created therein.

FIG. 7 is an isometric view of a press 110 that may be used to compress the fuel cell stack 90 in the enclosure 50, where like elements are referred to by the same reference numerals. The press 110 includes a plurality of press rods 112 that pass through a cover 114 that has been previously mounted on the press 110. The cover 114 is used as a top cover of the enclosure 50 after the stack 90 has been compressed. The enclosure 50 is seated upon a lower tool 116 that rests on a platform 118. Actuator 120 causes the plurality of press rods 112 to press down on the dry end structural frame 58. Although not shown for the sake of clarity, other components such as a programmable controller, sensors, a linear variable display set, and ancillary equipment may be included to facilitate the desired compression and assembly functions of the press 110.

The plurality of press rods 112 provide more uniform compression when compared to the single upper tool 24 of the press 10 shown in FIG. 1. Additionally, only the cover 114 needs to be suspended over the stack 90, meaning less press height is required. The bores in the cover 114 that the plurality of press rods 112 pass through may be easily sealed with standard plugs, ensuring a more reliable seal when compared to a cover that is used to cover the open area of the housing 18 that is necessary to allow the upper tooling 24 to pass therethrough.

Figure 8A:
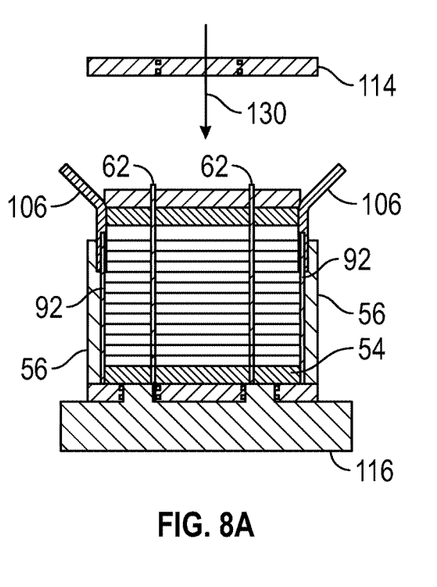
FIGS. 8a-8c illustrate a process for using the press to compress the fuel cell stack created in the enclosure.
Figure 8B:
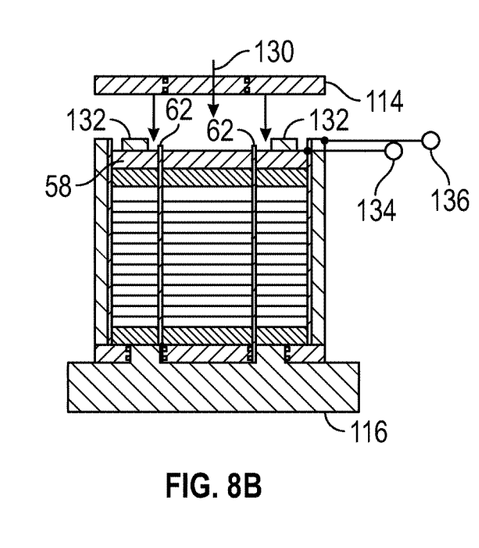
Figure 8C:
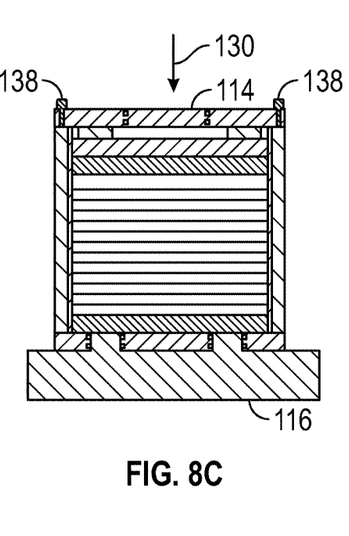

FIGS. 8a-8c illustrate a process that includes using the press 110 to compress the fuel cell stack 90 that is in the enclosure 50. FIG. 8a illustrates the cover 114 loaded onto the press 110. The press 110 is not shown for the sake of clarity, and is instead represented by arrow 130. Compression is applied to the stack 90, represented by the arrow 130, and the guides 106 are removed. If the insulation sleeves 92 were not previously installed, the insulation sleeves 92 may be installed at this time. FIG. 8b illustrates completing compression, measuring a stack height, represented by circle 134, and measuring an enclosure height, represented by a circle 136. The measured stack height includes measuring the height of four corners of the dry end structural frame 58. The difference between the measured stack height and the measured enclosure height (if any) is used to determine if shims 132 are needed. If so, the shims 132 are installed on a top face of the dry end structural frame 58. The datum pins 62 may be removed at this time. Alternatively, the datum pins 62 may be left in and a length trimmed off the ends to ensure that the datum pins 62 fit within the enclosure 50. Although not shown for the sake of clarity, other components such as a programmable controller, sensors, a linear variable display set, and ancillary equipment may be included to facilitate the desired compression and assembly functions of the press 110. FIG. 8c illustrates installing the cover 114 using fasteners 138. The stack 90 may be slightly over compressed while the cover and the fasteners 138 are being installed. Next, engineering tests such as leak tests and electrical tests are performed, although not shown for the sake of clarity. These tests may be performed using the lower tool 116, which includes a leak test manifold, and/or may be performed by accessing the stack 90 through access panels of the enclosure (not shown).

Using the process shown in FIGS. 6a-6d and the process shown in FIGS. 8a-8c, the fuel cell stack 90 may be assembled and aligned outside of the press 110, thereby reducing the amount of time the press 110 is required for each stack 90 compared to the process of FIGS. 2a-2e. By way of example, the process of FIGS. 2a-2e may require 45 minutes to completely house each stack 12 in the press 10, whereas the stack 90 is only in the press 110 for approximately 7 minutes. Thus, higher volume production and/or fewer presses may be realized. Because the enclosure 50 is affixed to the wet end structural frame 54 prior to loading stack components, an operator is not required to affix the enclosure 50 to the stack 90 blindly as is required in the process of FIGS. 2a-2e, and the press 110 used to compress the stack 90 does not need to be as tall because only the cover 114 is suspended over the stack 90.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell stack assembly and compression system, said system comprising:
   a fuel cell stack housing including a plurality of side walls that
      create an enclosure that is open on two opposing ends, wherein at least one of the side walls includes a channel that is formed on an inner wall surface;
   a first end structural frame affixed to one of the open ends of the housing, said first end structural frame including at least one datum on an edge of the end plate, said datum including a bore therethrough, said first end structural frame further including at least one tooling opening through a planar surface of the first end structural frame;
   tooling passing through the at least one tooling opening of the first end structural frame and that extends up through the housing to the open end of the housing, said tooling being capable of moving down incrementally while fuel cell stack components that each include at least one datum are being loaded into the housing through the open end that is opposite to the first end structural frame; and
   a press with a plurality of press rods that operate to compress a fuel cell stack that has been created by stacking the fuel cell components into the housing.

2. The system according to claim 1 wherein the datum of the first end structural frame and the datum of the fuel cell components align with the channel that is formed on the inner surface of the at least one of the side walls of the housing.

3. The system according to claim 1 wherein the fuel cell components that include the at least one datum are bipolar plates, insulator plates, current collector plates, and a second end structural frame.

4. The system according to claim 1 further comprising guides at the open end of the housing to guide the fuel cell stack components into the housing.

5. The system according to claim 1 further comprising a datum pin that extends through each channel formed on the inner wall surface of the at least one side wall of the housing, said datum pin passing through the bore of the datum of the first end structural frame and the bore of the datum of each of the fuel cell components as the fuel cell components are loaded onto the tooling.

6. The system according to claim 1 further comprising a cover of the housing that includes a plurality of openings that align with a configuration of the plurality of press rods so that the cover may be loaded into the press and inserted onto the open end of the housing while the plurality of press rods maintain compression on the fuel cell stack, said cover being configured to match the dimensions of the open end of the housing.

7. The system according to claim 6 further comprising a plurality of plugs that are configured to fit in each of the plurality of openings of the cover so as to environmentally seal the fuel cell stack within the housing after the cover has been installed and the plurality of press rods have been removed.

8. The system according to claim 6 further comprising shims that are placed on the top of the fuel cell stack to maintain compression on the fuel cell stack, said shims being installed before the press is removed and the cover is installed.

9. A method for assembling and compressing a fuel cell stack, said method comprising:
   providing a fuel cell stack housing including a plurality of side walls that create an enclosure that is open on two opposing ends, wherein at least one of the side walls includes a channel that is formed on an inner wall surface,
   affixing a first end structural frame to the housing at one of the open ends of the housing, said first end structural frame including at least one datum that aligns with the channel, said datum including a bore therethrough, said first end structural frame further including at least one tooling opening through a planar surface of the first end structural frame,
   extending tooling through the at least one tooling opening of the first end structural frame and up through the housing to the open end of the enclosure that is opposite to the first end structural frame, said tooling capable of moving down incrementally;
   stacking fuel cell components on the tooling near the open end of the enclosure, said fuel cell components each including at least one datum that aligns with the channel, said datum including a bore therethrough, wherein the tooling moves down incrementally as each of the fuel cell stack components are stacked on the tooling so that each of the fuel cell stack components are stacked in the same location and a fuel cell stack is created inside the enclosure as the tooling moves down incrementally; and
   providing a press with a plurality of press rods that operate to compress the fuel cell stack that has been created inside the enclosure.

10. The method according to claim 9 wherein the datum of the first end structural frame and the datum of each of the fuel cell components align with the channel that is formed on the inner wall surface of the at least one of the side walls.

11. The method according to claim 9 wherein the fuel cell components that include datum include bipolar plates, insulator plates, current collector plates, and a second end structural frame.

12. The method according to claim 9 further comprising providing guides at the open end of the housing to guide the fuel cell stack components into the housing.

13. The method according to claim 9 further comprising providing at least one datum pin where the datum pin is in the channel and passes through the bore of the datum of the first end structural frame and the bore of the datum of each of the fuel cell components as the fuel cell components move down incrementally with the tooling, said datum pins operating to provide plate-to-plate alignment.

14. The method according to claim 9 further comprising providing a cover that includes a plurality of openings that align with a configuration of the plurality of press rods so that the cover may be loaded into the press and inserted into the open end of the enclosure after compression of the fuel cell stack is complete.

15. The method according to claim 14 further comprising a plurality of plugs that are configured to fit in each of the plurality of openings in the cover so as to environmentally seal the fuel cell stack within the enclosure after the cover has been installed and the plurality of press rods have been removed.

16. A fuel cell stack assembly and compression system, said system comprising:
   a fuel cell stack housing including a plurality of side walls that create an enclosure that is open on two opposing ends, wherein at least one of the side walls includes a channel that is formed on an inner wall surface;
   a first end structural frame that is affixed to one of the open ends of the housing, said first end structural frame including at least one datum on an edge of the first end structural frame, said datum including a bore therethrough, said first end structural frame further including at least one tooling opening through a planar surface of the first end structural frame; and
   tooling that passes through the at least one tooling opening of the first end structural frame and that extends up through the housing to the open end of the housing, said tooling capable of moving down incrementally while fuel cell stack components that each include at least one datum are being loaded into the housing through the open end that is opposite to the first end structural frame.

17. The system according to claim 16 wherein the datum of the first end structural frame and the datum of the fuel cell components align with the channel that is formed on the inner surface of the at least one of the side walls of the housing.

18. The system according to claim 16 wherein the fuel cell components that include datum are bipolar plates, insulator plates, current collector plates, and a second end structural frame.

19. The system according to claim 16 further comprising guides at the open end of the housing to guide the fuel cell stack components into the housing.

20. The system according to claim 16 further comprising a datum pin that extends through each channel formed on the inner wall surface of the at least one side wall of the housing, said datum pin passing through the bore of the datum of the first end structural frame and the bore of the datum of each of the fuel cell components as the fuel cell components are loaded onto the tooling.

* * * * *